United States Patent Office 3,334,991
Patented Aug. 8, 1967

3,334,991
PLANT GROWTH REGULANT COMPOSITION
AND METHOD
Howard A. Hageman, Southbury, and Winchester L. Hubbard, Woodbridge, Conn., assignors to Uniroyal, Inc., a corporation of New Jersey
No Drawing. Original application Feb. 15, 1963, Ser. No. 258,923, now Patent No. 3,240,799, dated Mar. 15, 1966. Divided and this application Aug. 7, 1964, Ser. No. 388,297
16 Claims. (Cl. 71—88)

This application is a division of our application Ser. No. 258,923, filed Feb. 15, 1963, now U.S. Patent No. 3,240,799, which is a continuation-in-part of our application Ser. No. 89,654, filed Feb. 16, 1961, now abandoned.

This invention relates to plant growth regulants.

The plant growth regulants of the present invention are new compounds, namely N-disubstituted amino amic acids, in which the disubstituted amino radical is selected from dialkylamino, 1-pyrrolidyl, 1-piperidyl and 4-morpholinyl radicals, and the amic acid is selected from maleamic, alpha-alkylmaleamic, succinamic, alpha-alkyl succinamic, alpha-alkenylsuccinamic, alpha-arylsuccinamic, alpha-acyloxysuccinamic, alpha-alkylthiosuccinamic and alpha-arylthiosuccinamic acids, and the salts, esters and imides of said N-disubstituted amino amic acids.

The N-disubstituted amino amic acids are prepared by reacting the selected 1,1-disubstituted hydrazine with the anhydride of the selected dicarboxylic acid. The imides of these acids are prepared by removing water from the acid by means of acetic anhydride.

Illustrative reactions for the formation of N-dimethylaminomaleamic acid and N-dimethylaminomaleimide are as follows:

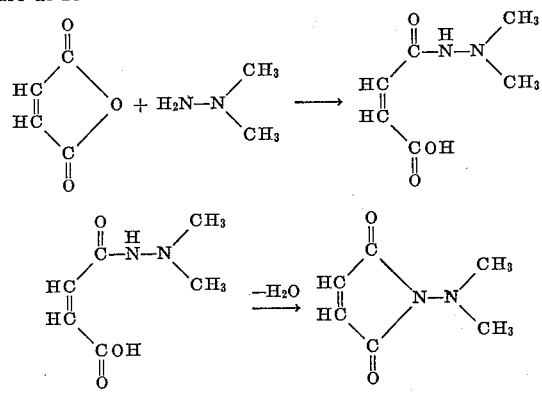

The acids may be used as plant growth regulants in the form of the free acids or their equivalent salts, such as the alkali salts, i.e. alkali metal, ammonium or amine (substituted ammonium) salts, e.g. sodium, potassium, ammonium, methyl ammonium, dimethyl ammonium, trimethyl ammonium, ethyl ammonium, ethanol ammonium, diethanol ammonium, or triethanol ammonium salts, since the salts give equivalent results. The salts may readily be formed directly from the acid and a selected base such as an alkali-metal hydroxide or carbonate, or ammonia, or an amine.

The esters of the N-disubstituted amino amic acids, such as the alkyl esters having 1 to 12 carbon atoms in the esterifying radical and the alkenyl esters having 3 to 4 carbon atoms in the esterifying radical may be used as plant growth regulants, e.g., the methyl, ethyl, propyl, butyl, octyl, dodecyl, allyl and methallyl esters. The esters may be formed by esterifying the selected N-disubstituted amino amic acid with the selected alcohol, or by reacting the selected alcohol with the imide of the selected N-disubstituted amino amic acid.

The N-disubstituted amino amic acids and the imides of the present invention may be represented by the general formulae

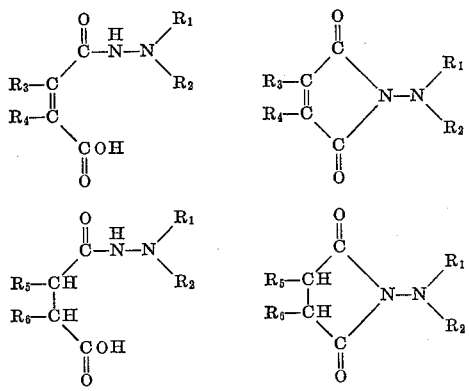

wherein $R_1$ and $R_2$ each stand for an alkyl group having 1 to 12 carbon atoms or $R_1$ and $R_2$ compositely stand for a $-(CH_2)_4-$, $-(CH_2)_5-$ or $(-CH_2CH_2)_2O$ group; and $R_3$ and $R_4$ each stand for hydrogen, or one of $R_3$ and $R_4$ stands for hydrogen and the other stands for a lower alkyl group having 1 to 8 carbon atoms, e.g. methyl, butyl, octyl; and $R_5$ and $R_6$ each stand for hydrogen, or one of $R_5$ and $R_6$ stands for hydrogen and the other stands for one of the following: an alkyl group having 1 to 12 carbon atoms, e.g. methyl, octyl, dodecyl; an alkenyl group having 3 to 12 carbon atoms, e.g. propenyl, tetrapropenyl ($C_{12}H_{23}-$); an aryl group, e.g. phenyl, tolyl, naphthyl; an acyloxy group, e.g. acetoxy; an alkylthio group having 1 to 12 carbon atoms, e.g. methylthio, hexylthio, dodecylthio; an arylthio radical, e.g. phenylthio, tolylthio, naphthylthio.

After testing a variety of N-disubstituted amino amic acids and their imides, it has been found that the essential structural arrangement for growth regulant activity is one in which the carboxyl group of the acid is removed by two carbon atoms from the

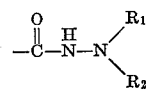

moiety, and the intermediate two carbon moiety can not be part of an aromatic ring. In the chemicals of the present invention, the intermediate two carbon moiety is part of a functionally aliphatic grouping.

Examples of chemicals of the present invention are:

N-dimethylaminomaleamic acid
N-dioctylaminomaleamic acid
N-didodecylaminomaleamic acid
N-(4-morpholinyl)maleamic acid
Sodium N-dimethylaminomaleamate
Ispropyl N-dimethylaminomaleamate
N-dimethylaminocitraconamic acid
N-dimethylaminomaleimide
N-(4-morpholinyl)maleimide
Ethyl N-dimethylaminosuccinamate
Diethanolammonium salt of N-dimethylaminosuccinamic acid
Allyl N-dimethylaminosuccinamate
N-dimethylamino-alpha-acetoxysuccinamic acid
N-dimethylamino-alpha-phenylsuccinamic acid
N-dimethylamino-alpha-phenylthiosuccinimide
Sodium N-dimethylamino-alpha-phenylthiosuccinamate Specific illustrative examples of the preparation of the compounds of the present invention are shown in Examples 1 to 10 below:

EXAMPLE 1

*Preparation of N-dimethylaminomaleamic acid*

A three liter three necked flask containing a solution of 294 g. (3.0 moles) of maleic anhydride in 300 g. of acetonitrile was immersed in an ice bath. Over ½ hour a solution of 180 g. (3.0 moles) of 1,1-dimethylhydrazine in 100 g. of acetonitrile was added from a dropping funnel as the reaction mixture was stirred vigorously. During this addition the temperature of the reaction mixture did not exceed 30° C. Near the end of the addition a large amount of a cream colored, crystalline solid precipitated from the solution. After the addition was complete stirring was continued for twenty minutes and then 700 ml. of ether was added to cause further precipitation of the product from solution. Filtration of this reaction mixture gave a filter cake, which after washing with three 100 ml. portions of ether, amount to 428 g. (90% yield) of N-dimethylaminomaleamic acid of M.P. 121–124° C.

A sample of this material after one recrystallization from acetone had M.P. 123–125° C. *Analysis.*—Calculated for $C_6H_{10}N_2O_3$: 45.6% C, 6.3% H, 17.7% N. Found: 45.9% C, 6.5% H, 17.7% N.

EXAMPLE 2

*Preparation of N-(4-morpholinyl)maleamic acid*

The N-(4-morpholinyl)maleamic acid was obtained by reacting N-aminomorpholine with maleic anhydride by the procedure of Example 1. It is a colorless crystalline solid of M.P. 172–174° C. *Analysis.*—Calculated for $C_8H_{12}N_2O_4$: 48.0% C, 6.0% H, 14.0% N. Found: 48.3% C, 6.1% H, 13.5% N.

The N-(1-pyrrolidyl)maleamic acid and N-(1-piperidyl)maleamic acid may similarly be prepared from N-aminopyrrolidine and N-aminopiperidine, respectively, and maleic anhydride.

EXAMPLE 3

*Preparation of N-dimethylaminomaleimide*

To 312 g. (2.0 moles) of N-dimethylaminomaleamic acid of M.P. 121–124° C. (prepared as in Example 1) in a 1-liter Erlenmeyer flask was added 255 g. (2.5 moles) of acetic anhydride. Over ½ hour this mixture was gradually warmed to 75° C. on the steam bath. As the temperature reached 65–70° C., all of the solid dissolved to give a clear amber solution. After keeping this solution at 75–80° C. for ½ hour, it was allowed to cool over about 1 hour to 45–50° C.

This solution was then subjected to vacuum distillation employing a short (8-inch) still head. After the acetic acid and acetic anhydride had been removed, the dark liquid residue was brought to a temperature of 70° C. under a pressure of 2–3 mm. A yellow-orange liquid distillate amounting to 200 g. was then collected with a still head temperature in the range of 68–84° C. and a pressure of 2–3 mm. As the distillate cooled, it set to a yellow-orange crystalline mass. The residue in the distilling flask consisted of 30–40 g. of a black brittle resin which is readily soluble in water.

The distillate obtained above was then heated successively with several 500 ml. portions of cyclohexane to 65–70° C. with agitation. This resulted in a two-phase system in which the cyclohexane layer became a clear gold yellow color. The lower layer consisted of a dark brown viscous oil. After agitation was stopped and the layers had separated cleanly, the hot cyclohexane layer was decanted. After four more similar extractions, the combined cyclohexane solutions (ca. 2.5 liters) were cooled in an ice bath resulting in the precipitation of 133 g. (48% yield) of N-dimethylaminomaleimide as long bright yellow needles of M.P. 81–83° C. By recrystallizing a sample of this material again from cyclohexane an analytical sample of M.P. 82–83° C. was obtained having the following elemental analysis. Calculated from $C_6H_8N_2O_2$: 51.4% C, 5.7% H, 20.0% N. Found: 51.7% C, 5.9% H, 19.5% N.

EXAMPLE 4

*Preparation of N-dimethylaminosuccinamic acid*

To a solution of 50 g. (.50 mole) of succinic anhydride in 150 g. of acetonitrile was added a solution of 30 g. (.50 mole) of 1,1-dimethylhydrazine in 50 g. of acetonitrile. After the exothermic reaction had subsided the mixture was cooled in an ice bath and the precipitate collected by filtration. A yield of 74 g. (92%) of N-dimethylaminosuccinamic acid as a colorless crystalline solid of M.P. 154–156° C. was obtained. A sample of this material after recrystallization from ethanol gave colorless crystals of M.P. 154–155° C.

EXAMPLE 5

*Preparation of N-dimethylaminosuccinimide*

To 64 g. (.40 mole) of N-dimethylaminosuccinamic acid (prepared as in Example 4) was added 80 g. (.80 mole) of acetic anhydride. After heating this mixture to 90–100° C. for 15 to 20 minutes, there resulted a clear yellow solution. After keeping at 100–110° C. for 30 minutes, this solution was allowed to cool slowly (over 30–40 minutes) to 50–55° C. The acetic acid and acetic anhydride were then removed by distillation under a pressure of 5–10 mm. The residual liquid was then maintained at 80–85° C. for 15 minutes under a pressure of 3–4 mm. There was obtained 53 g. of a clear light amber liquid which set to a crystalline mass after cooling in an ice bath. By recrystallizing this material from ether there was obtained 32 g. of N-dimethylaminosuccinimide as colorless needles of M.P. 53–55° C.

EXAMPLE 6

*Preparation of ethyl N-dimethylaminosuccinamate*

This example illustrates the preparation of an ester from an N-disubstituted amino amic acid.

Into a mixture of 40 g. (.25 mole) of N-dimethylaminosuccinamic acid and 300 ml. of absolute ethanol was passed 10 g. of anhydrous HCl. After refluxing this mixture for 2 hours all the solid dissolved to give a clear solution. Over an additional 1 hour, one-half of the ethanol was removed by distillation. After cooling this solution in an ice bath for 1 hour and then adding 100 ml. of ether, the precipitated solid was collected by filtration and washed with ether. There was obtained 38 g. of the hydrochloride of ethyl N-dimethylaminosuccinamate as colorless crystals of M.P. 125–129° C.

A sample of 11.2 g. (.05 mole) of this ester hydrochloride was covered with 200 ml. of ether. After adding 5.0 g. (.05 mole) of triethylamine and vigorously agitating for ½ hour, the mixture was filtered and the filter cake washed with two 50 ml. portions of ether. The filtrate was then reduced to a volume of 150 ml. by distillation. Upon cooling this ether solution in an ice bath and subsequently collecting the precipitated solid by filtration, there was obtained 6.2 g. of ethyl N-dimethylaminosuccinamate as colorless crystals of M.P. 70–72° C.

EXAMPLE 7

*Preparation of n-butyl N-dimethylaminosuccinamate*

This example illustrates the preparation of an ester from an imide of an N-disubstituted amino amic acid.

A solution of 14.2 g. (.10 mole) of N-dimethylaminosuccinimide in 74 g. of n-butanol was treated with anhydrous HCl until 3.6 g. (.10 mole) had been absorbed. This slurry was then heated to 105–115° C. for 2 hours giving a clear, colorless solution. After cooling in an ice bath, a white, crystalline solid precipitated. After adding 50 ml. of ether, filtration gave 19.5 g. of colorless crystals of M.P. 102–104° C. This compound is the hydrochloride of n-butyl N-dimethylaminosuccinamate.

A sample of 12.6 g. (.05 mole) of this hydrochloride was covered with 150 ml. of ether. After adding 5.0 g. (.05 mole) of triethylamine, the mixture was vigorously agitated for ½ hour. The solid triethylamine hydrochloride was then removed by filtration and the ether filtrate cooled in an ice bath. Filtration of the precipitated solid gave 4.5 g. of n-butyl N-dimethylaminosuccinamate as colorless crystals of M.P. 45–47° C.

EXAMPLE 8

*Preparation of N-dimethylamino-alpha-tetrapropenylsuccinamic acid*

The tetrapropenylsuccinic anhydride employed was obtained from Monsanto Chemical Company and is designated to contain a $C_{12}H_{23}$— group in the alpha position. By reacting this anhydride with an equimolar amount to 1,1-dimethylhydrazine in acetonitrile as the reaction medium a clear yellow solution is obtained. After removing the acetonitrile from this solution by distillation under vacuum the N-dimethylamino-alpha-tetrapropenylsuccinamic acid is obtained as a clear yellow viscous liquid.

EXAMPLE 9

*Preparation of N-dimethylamino-alpha-acetoxysuccinamic acid*

To a solution of 15 g. (.10 mole) of alpha-acetoxysuccinic anhydride, of M.P. 56–57° C., in 20 g. of acetonitrile, there was added, in small portions 6.0 g. (.10 mole) of 1,1-dimethylhydrazine. During the mixing an ice bath was employed to prevent the temperature of the reaction mixture from exceeding 35° C. After allowing this mixture to stand for one hour, the acetonitrile was removed by distillation under vacuum. By keeping the residue at a temperature of 40–45° C. for two hours under a pressure of 2–3 mm., there was obtained 21 g. of a viscous light brown liquid which partially crystallized after standing several hours.

EXAMPLE 10

*Preparation of N-dimethylamino-alpha-phenylthiosuccinimide*

To a solution of 14 g. (.10 mole) of N-dimethylaminomaleimide (prepared as in Example 3) in 20 g. of benzene was added 11 g. (.10 mole) of thiophenol (phenyl mercaptan). After warming this mixture to 60–65° C., a few crystals of benzoyl peroxide were added and the mixture was allowed to stand for 1½ hours. After removing the benzene by distillation, the residue was kept at 65–70° C. under a pressure of 2–3 mm. for ½ hour. The residual yellow liquid (24 g.) was dissolved in 70 ml. of warm ethanol. After cooling this solution in an ice bath, the precipitated solid was collected by filtration. There was obtained 17 g. of N-dimethylamino-alpha-phenylthiosuccinimide as colorless crystals, M.P. 70–71° C.

The sodium salt of N-dimethylamino-alpha-phenylthiosuccinamic acid may be prepared from the N-dimethylamino-alpha-phenylthiosuccinimide by reaction with sodium hydroxide, and the free acid may be obtained from the sodium salt by treatment with a strong inorganic acid, e.g. hydrochloric acid.

N-dimethylamino-alpha-alkylthiosuccinimides may be prepared similarly to the N-dimethylamino-alpha-phenylthiosuccinimide by reacting the N-dimethylaminomaleimide with the selected alkyl mercaptan.

The chemicals of the present invention may be applied to plants, which term includes various plant parts such as seeds, flowers, fruits, vegetables, roots and foliage in various manners. Seeds may be treated directly with the chemical before planting, or seeds may be treated with the chemical by incorporating the chemical in the soil before or after planting the seeds. The chemicals may be applied to plants in an inert medium as a dust in admixture with a powdered solid carrier, such as the various mineral silicates, e.g. mica, talc, pyrophyllite and clays or as an aqueous composition. The chemicals may be applied in admixture with small amounts of surface-active wetting agents, which may be anionic, non-ionic, or cationic surface-active agents, generally as aqueous compositions. The chemicals may be dissolved in organic solvents such as acetone, benzene, or kerosene, and the solutions of the chemicals emulsified in water with the aid of surface-active agents. Such surface-active agents are well known and reference is made to U.S. Patent No. 2,547,724, columns 3 and 4, for detailed examples of the same. The chemicals of the invention may be admixed with powdered solid carriers, such as mineral silicates, together with a surface-active agent so that a wettable powder may be obtained which may be applied directly to plants, or which may be shaken up with water for application to the plants in that form.

The effectiveness of the chemicals of the present invention as non-injurious plant growth regulants, and particularly as dwarfing agents, is illustrated in the following examples:

EXAMPLE A

This example illustrates the treatment of growing plants with the chemicals of the present invention.

Water solutions or dispersions of the chemicals were prepared containing 5000 parts per million (p.p.m.) of various chemicals of the invention and a small amount of a surface-active wetting agent (polyoxyethylene sorbitan monolaurate) which is known to be inactive in the tests run.

Peanut plants in the 2 to 3 leaf stage were sprayed to run off with aqueous compositions prepared as above containing 5000 p.p.m. of N-dimethylaminomaleamic acid, N-di-n-octylaminomaleamic acid, N-dimethylaminocitraconamic acid, N-dimethylaminomaleimide, N-(4-morpholinyl)maleamic acid, N-(4-morpholinyl)maleimide, N-dimethylaminosuccinamic acid, N-dimethylaminosuccinimide, methyl N-dimethylaminosuccinamate, ethyl N-dimethylaminosuccinamate, isopropyl-N-dimethylaminosuccinamate, and n-butyl N-dimethylaminosuccinamate, N-dimethylamino-alpha-tetrapropenylsuccinamic acid, N-dimethylamino-alpha-phenylsuccinamic acid, and N-dimethylamino-alpha-phenylthiosuccinimide. The treated plants and untreated control plants were then placed in a chamber having 100% humidity and a temperature of 75° F. After 24 hours, they were taken out and placed in a greenhouse. The plants were examined two to four weeks after the application of the chemicals. There was a decided dwarfing or shortening of the internodes of the peanut plants treated with the chemicals on comparison with the untreated control plants.

Similar tests to the above on pinto bean plants with application of solutions of 2500, 1250 and 625 p.p.m. of the sodium, ammonium, monoethylamine, diethylamine, triethylamine and diethanolamine salts of N-dimethylamino-succinamic acid (which salts were prepared by adding the respective bases to 10% solutions of the free acid to give pH of 6.5) showed a decided dwarfing of the plants treated with the chemicals on comparison with the untreated control plants.

Other crops such as soybeans, and squash show similar dwarfing on treatment with the chemicals of the present invention.

EXAMPLE B

This example illustrates the direct treatment of seeds with the chemicals of the present invention.

Pinto beans seeds were immersed in 100 ml. of aqueous compositions containing 1000 parts per million of the following chemicals prepared similarly to the compositions in Example A: N-dimethylaminomaleamic acid, N-di-n-dodecylaminomaleamic acid, N-dimethylaminomaleimide, N-(4-morpholinyl maleamic acid, N-dimethylaminosuccinamic acid, ethyl N-dimethylaminosuccinamate, N-dimethylamino - alpha - tetrapropenylsuccinamic acid, N-dimethyamino-alpha-acetoxysuccinamic acid, N-dimethylaminosuccinimide, N-dimethylamino-alpha-phenylthiosuccinimide. After four hours, the seeds were removed, washed thoroughly in water for several minutes, and planted in soil contained in four-inch pots. Untreated control seeds were similarly planted. Observations two to four weeks after planting showed decided dwarfing of the plants treated with the chemicals on comparison with the untreated control plants.

EXAMPLE C

This example illustrates seed treatment with the chemicals by incorporating the chemicals in the soil.

Two-tenths of a gram of each of the following dry chemicals were mixed uniformly with ¼ lb. of dry sand: N-dimethylaminomaleamic acid, N-dimethylaminomaleamide, N-dimethylaminosuccinamic acid, N-dimethylaminosuccinimide, and N-dimethylamino-alpha-phenylthiosuccinimide. The sand and chemical mixtures were then each added to four and a quarter pounds of a 4:1 soil and sand mixture, and were tumbled for five minutes. At the end of this time, the chemicals were uniformly distributed throughout the soil and sand mixture at a rate of one hundred parts of the chemicals per million parts of the soil and sand. The thus treated soil and sand were then placed in 4-inch pots in which pinto bean seeds were planted. Pinto bean seeds were also planted in pots contaiing untreated control soil and sand. Observations after two to four weeks showed definite dwarfing of the plants from seeds that were planted in soil treated with the chemicals of the present invention in comparison with the plants from seeds that were planted in the untreated control soil.

Having thus described our invention, what we claim and desire to protect by Letters Patent is:

1. A plant growth regulant composition which comprises a plant growth regulating, but non-injurious, amount of an N-disubstituted amino amic acid, in which:
   (I) the disubstituted amino radical is selected from the group consisting of dialkylamino in which each alkyl group has 1 to 12 carbon atoms, 1-pyrrolidyl, 1-piperidyl, 4-morpholinyl, and
   (II) the amic acid is one having the formula:
   $$HOOCCR_1=CR_2CONH_2$$
   wherein either $R_1$ or $R_2$ is hydrogen and the other is:
      hydrogen or an alkyl group having 1 to 8 carbon atoms, or
   $HOOCCHR_3$—$CHR_4CONH_2$, wherein $R_3$ or $R_4$ is hydrogen and the other is:
      hydrogen, an alkyl having 1 to 12 carbon atoms, an alkenyl having 3 to 12 carbon atoms, a phenyl, a tolyl, a naphthyl, an acetoxy, an alkylthio having 1 to 12 carbon atoms, phenylthio, tolylthio, or naphthylthio group;
   or the alkali metal salts, the ammonium salts, the amine salts, the alkyl esters in which the alkyl group has 1 to 12 carbon atoms, the allyl esters, the methallyl esters, or the imides of said N-disubstituted amino amic acid; and a surface active agent.

2. The plant growth regulant of claim 1 wherein the amic acid is maleamic acid.

3. The plant growth regulant of claim 1 wherein the amic acid is succinamic acid.

4. A method of regulating plant growth which comprises treating plants with a plant growth regulating, but non-injurious, amount of an N-disubstituted amino amic acid, in which:
   (I) the disubstituted amino radical is selected from the group consisting of dialkylamino in which each alkyl group has 1 to 12 carbon atoms, 1-pyrrolidyl, 1-piperidyl, 4-morpholinyl, and
   (II) the amic acid is one having the formula:
   $$HOOCCR_1=CR_2CONH_2$$
   wherein either $R_1$ or $R_2$ is hydrogen and the other is:
      hydrogen or an alkyl group having 1 to 8 carbon atoms, or
   $HOOCCHR_3$—$CHR_4CONH_2$, wherein $R_3$ or $R_4$ is hydrogen and the other is:
      hydrogen, an alkyl having 1 to 12 carbon atoms, an alkenyl having 3 to 12 carbon atoms, a phenyl, a tolyl, a naphthyl, an acetoxy, an alkylthio having 1 to 12 carbon atoms, phenylthio, tolylthio, or naphthylthio group;
   or the alkali metal salts, the ammonium salts, the amine salts, the alkyl esters in which the alkyl group has 1 to 12 carbon atoms, the allyl esters, methallyl esters, or the imides of said N-disubstituted amino amic acid.

5. The method of claim 4 wherein said amic acid is maleamic acid.

6. The method of claim 4 wherein said amic acid is succinamic acid.

7. A method of regulating plant growth which comprises treating seeds with a plant growth regulating, but non-injurious, amount of an N-disubstituted amino amic acid, in which:
   (I) the disubstituted amino radical is selected from the group consisting of dialkylamino in which each alkyl group has 1 to 12 carbon atoms, 1-pyrrolidyl, 1-piperidyl, 4-morpholinyl, and
   (II) the amic acid is one having the formula:
   $$HOOCCR_1=CR_2CONH_2$$
   wherein either $R_1$ or $R_2$ is hydrogen and the other is:
      hydrogen or an alkyl group having 1 to 8 carbon atoms, or
   $HOOCCHR_3$—$CHR_4CONH_2$, wherein $R_3$ or $R_4$ is hydrogen and the other is:
      hydrogen, an alkyl having 1 to 12 carbon atoms, an alkenyl having 3 to 12 carbon atoms, a phenyl, a tolyl, a naphthyl, an acetoxy, an alkylthio having 1 to 12 carbon atoms, phenylthio, tolylthio, or naphthylthio group;
   or the alkali metal salts, the ammonium salts, the amine salts, the alkyl esters in which the alkyl group has 1 to 12 carbon atoms, the allyl esters, the methallyl esters, or the imides of said N-disubstituted amino amic acid.

8. The method of regulating plant growth of claim 7 wherein the amic acid is maleamic acid.

9. The method of regulating plant growth of claim 7 wherein the amic acid is succinamic acid.

10. A method of regulating plant growth which comprises treating a plant with a plant growth regulating, but non-injurious, amount of an N-dialkylaminomaleamic acid in which each alkyl group has 1 to 12 carbons.

11. A method of regulating plant growth which comprises treating a plant with a plant growth regulating, but non-injurious, amount of an N-dialkylaminomaleamic acid.

12. A method of regulating plant growth which comprises treating a plant with a plant growth regulating, but non-injurious, amount of an N-dialkylaminosuccinamic acid in which each alkyl group has 1 to 12 carbons.

13. A method of regulating plant growth which comprises treating a plant with a plant growth regulating, but non-injurious, amount of an N-dimethylaminosuccinamic acid.

14. A method of regulating plant growth which comprises treating a plant with a plant growth regulating, but non-injurious, amount of a dimethylaminomaleimide.

15. A method of regulating plant growth which comprises treating a plant with a plant growth regulating, but non-injurious, amount of a dimethylaminosuccinimide.

16. A method of regulating plant growth which comprises treating a plant with a plant growth regulating, but non-injurious, amount of a butyl-N-dimethylaminosuccinamate.

(References on following page)

References Cited

UNITED STATES PATENTS 2,821,521   1/1958   Price _____ 260—534 X

FOREIGN PATENTS 176,563   11/1953   Austria.

OTHER REFERENCES

Steck: J. Am. Chem. Soc., vol. 76, pp. 4454–7 (1954).

LEWIS GOTTS, *Primary Examiner.*

JAMES O. THOMAS, *Examiner.*

UNITED STATES PATENT OFFICE
CERTIFICATE OF CORRECTION

Patent No. 3,334,991                                                     August 8, 1967

Howard A. Hageman et al.

It is certified that error appears in the above identified patent and that said Letters Patent are hereby corrected as shown below:

Column 7, lines 54 and 55, Column 8, lines 9 and 10, and lines 39 and 40, before "phenylthio", "tolylthio" and "naphthylthio", each occurrence, insert -- a --. Column 8, line 13, before "methallyl" insert -- the --.

Signed and sealed this 12th day of August 1969.

(SEAL)
Attest:

Edward M. Fletcher, Jr.                                WILLIAM E. SCHUYLER, JR.
Attesting Officer                                                 Commissioner of Patents